(12) United States Patent
Kwan et al.

(10) Patent No.: US 7,899,454 B2
(45) Date of Patent: *Mar. 1, 2011

(54) TELECOMMUNICATIONS SUBSCRIBER PROFILE MANAGEMENT SYSTEM

(75) Inventors: Arvie Kwan, Toronto (CA);
Christopher R. McRaild, Guelph (CA);
Bohdan K. Zabawskyj, Woodbridge (CA)

(73) Assignee: Redknee Inc., Mississauga (CA)

( * ) Notice: Subject to any disclaimer, the term of this patent is extended or adjusted under 35 U.S.C. 154(b) by 467 days.

This patent is subject to a terminal disclaimer.

(21) Appl. No.: 11/972,903

(22) Filed: Jan. 11, 2008

(65) Prior Publication Data

US 2008/0176549 A1    Jul. 24, 2008

Related U.S. Application Data

(62) Division of application No. 10/638,377, filed on Aug. 12, 2003, now Pat. No. 7,379,737.

(51) Int. Cl.
*H04W 4/00* (2009.01)
(52) U.S. Cl. ............... 455/432.2; 455/424; 455/432.3; 455/433; 455/435.1; 709/217; 709/218; 709/219; 709/223; 709/225; 719/311; 370/401; 370/465; 370/466; 370/467
(58) Field of Classification Search ............ 455/432.2, 455/432.3, 433, 435.1, 424; 709/217, 218, 709/219, 223, 225, 238, 242; 707/10, 3; 370/465, 466, 467, 401; 719/311
See application file for complete search history.

(56) References Cited

U.S. PATENT DOCUMENTS 5,828,959 A    10/1998 Soderbacka
5,852,776 A    12/1998 Ohlsson
5,999,973 A *  12/1999 Glitho et al. ............... 709/223
6,108,540 A     8/2000 Sonti et al.
6,134,544 A    10/2000 Glitho et al.
6,138,017 A    10/2000 Price et al.
6,161,136 A *  12/2000 Hyndman et al. ........... 709/223
6,278,697 B1    8/2001 Brody et al.
6,445,919 B1    9/2002 Suonvieri
6,507,589 B1 *  1/2003 Ramasubramani et al. .. 370/465
6,512,824 B1 *  1/2003 Hsieh et al. ................. 379/230
6,697,620 B1 *  2/2004 Lamb et al. ............... 455/432.1

(Continued)

*Primary Examiner*—Charles N Appiah
*Assistant Examiner*—Olumide T Ajibade-Akonai
(74) *Attorney, Agent, or Firm*—T. Andrew Currier; David J. Johnson; Perry + Currier Inc.

(57) ABSTRACT

A telecommunications subscriber profile management method for a telecommunications subscriber profile management system including a customer service representative ("CSR") terminal. The terminal presents subscriber profile data in a common user interface format. The terminal receives input in a common format, the input representing commands for management of said subscriber profile data. The system includes at least two disparate network elements, each element having a common function. Each of the elements for stores respective portions of subscriber profile data, in disparate formats. The method preferably includes: (i) connecting to the customer service representative terminal; (ii) interfacing with each of the disparate network elements; (iii) collecting, routing, and formatting data exchanges between the terminal and the network elements; and (iv) configuring the subscriber profile data in a common format for the terminal while respective portions of the subscriber profile data are configured for storage in disparate formats respective to each the network element.

13 Claims, 1 Drawing Sheet

U.S. PATENT DOCUMENTS

| | | |
|---|---|---|
| 6,704,796 B1 | 3/2004 | Cosgriff et al. |
| 6,744,773 B1 | 6/2004 | Harris et al. |
| 6,968,553 B1 * | 11/2005 | Theeten .................. 719/311 |
| 7,120,451 B2 | 10/2006 | Agarwal et al. |
| 7,127,527 B1 | 10/2006 | Greenwalt et al. |
| 7,162,722 B1 * | 1/2007 | Supinski et al. ............ 719/310 |
| 2001/0056422 A1 | 12/2001 | Benedict et al. |
| 2002/0042277 A1 | 4/2002 | Smith |
| 2002/0197991 A1 | 12/2002 | Anvekar et al. |
| 2004/0229609 A1 | 11/2004 | Yamaguchi |
| 2005/0055220 A1 | 3/2005 | Lee et al. |
| 2005/0202816 A1 | 9/2005 | Warsta et al. |
| 2007/0066303 A1 | 3/2007 | Ala-Luukko |

* cited by examiner

US 7,899,454 B2

TELECOMMUNICATIONS SUBSCRIBER PROFILE MANAGEMENT SYSTEM

This is a divisional of U.S. patent application Ser. No. 10/638,377 (allowed), filed Aug. 12, 2003, the contents of which are incorporated herein by reference.

BACKGROUND ART

It has been long documented in the art that graphical user interfaces (GUIs) provide certain and considerable advantages in the operation of computer and other logically based media. However we submit that nothing within the state of the art particularly intimates or otherwise suggests of a telecommunications subscriber profile management system as that detailed herein seeking the protection of Letters Patent. Indeed, implemented as part of a computer program product, the invention herein presents (in the preferred embodiment) a common graphical user interface to telecommunications network administrators or customer service representatives (and like personnel who ordinarily manage telecommunication's subscriber profiles), where said relevant core network equipment may have been acquired from disparate vendors and/or where such networks may have recently consolidated otherwise disparate operations.

TECHNICAL FIELD

The present invention relates generally to telecommunications management systems; and in particular, to a method and system for performing subscriber management transactions, queries and functions across multi-vendor telecommunications network elements/environments.

SUMMARY OF THE INVENTION

Implemented as part of a computer program product, the invention herein presents (in the preferred embodiment) a common graphical user interface to telecommunications network administrators or customer service representatives (CSRs) (and like personnel who ordinarily manage telecommunication's subscriber profiles), where said relevant core network equipment may have been acquired from disparate vendors and/or where such networks may have recently consolidated otherwise disparate operations.

Often the CSR and/or telecommunications network administrator requires certain information to input the appropriate command(s) when performing a specified task, however, these commands are not universal across multi-vendor telecommunications network elements as Home Location Registers (HLRs) and other multi-vendor elements which may store user profiles and data of comparable nature. Indeed, ergo concordantly in advancing the art it will be recognized that the lack of a unified interface to multiple multi-vendor elements which may store user profiles and data of comparable nature, increases the level of sophistication required in its manipulation and ultimately reduces and lessens the efficacy of customer service capabilities and operations.

Specialized logical commands pertinent to the relevant network element (which ordinarily stores user profiles and data of comparable nature) are abstracted, such that the user interacts with a single web GUI for all such multi-vendor elements which may store user profiles and data of comparable nature (as HLRs). The computer program product which implements the telecommunications subscriber profile management system determines the appropriate commands to send, and which network element to send them to. For instance, the computer program product which implements the telecommunications subscriber profile management system enables and provides a unified, smooth interface into a plurality of HLRs (for instance), and also, into a plurality of Application Location Registers (ALRs) for HLR queries, among other such multi-vendor elements which may store user profiles and data of comparable nature. The computer program product which implements the invention exploits several internal databases to enable it to identify the multi-vendor elements which may store user profiles and data of comparable nature (for instance, the HLR of particular subscribers), and the prepaid settings appropriate for particular prepaid subscribers (as applicable). Another manifestation of the invention provides a secure repository for information objects associated with a plurality of subscribers which can be accessed, modified and/or uploaded to external entities or other such mechanisms vis-a-vis the relevant articulated interface.

DETAILED DESCRIPTION OF THE PREFERRED EMBODIMENTS

Figure 1:
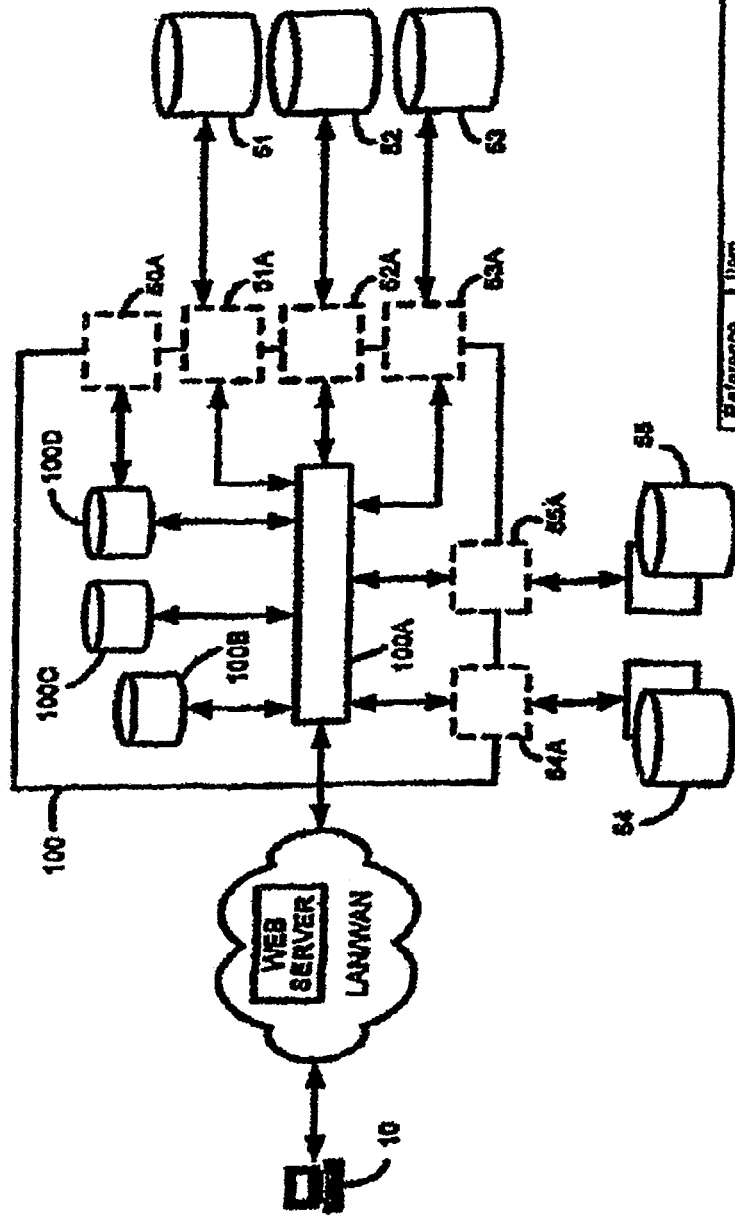
FIG. 1 illustrates a typical, non-limiting embodiment of the system level architecture employed in the disclosure of present.

With reference now to FIG. 1, the computer program product which implements the telecommunications subscriber profile management system 100 provides a unified interface into multi-vendor Home Location Registers (HLRs) 51, 52, 53, Application Location Registers (ALRs) 54 for HLR queries and other telecommunications network elements 55 which ordinarily store user profiles and data of comparable nature. In the preferred embodiment, the computer program product which implements the telecommunications subscriber profile management system 100 provides a web-based User Interface (UI) 10 that enables network administrators to easily manage users and for customer service representatives (CSRs) to manage subscriber profiles. In alternate embodiments, the UI may be implemented through any combination of Braille, auditory commands and like features for the visually impaired (such technologies remain well documented in the art).

The invention of present employs several internal databases 100B (contains the rules), 100C (transaction database), 100D (secure repository for information objects associated with a plurality of subscribers, including SIM information), to enable it to identify the relevant network element(s) associated with particular subscribers, and the appropriate subscriber service settings. The computer program product which implements the telecommunications subscriber profile management system 100 functionally and mechanically integrates with multi-vendor network elements 51, 52, 53, 54, 55 for rapid seamless single entry point for subscriber management queries to the HLRs (51, 52, 53), ALRs 54 and other multi-vendor elements 55 which may store user profiles and data of comparable nature.

So now in the preferred embodiment, once logged into the computer program product which implements the telecommunications subscriber profile management system 100, network administrators (and like personnel) are able to access specific information depending on their access level (as defined by state of the art security, authentication and permissions technology). Queries from network administrators (and like personnel) are collected by the invention 100 and routed 100A to the correct HLR 51, 52, 53 (by the appropriate articulated interface 51A, 52A and/or 53A respectively), or other such multi-vendor telecommunications network elements 54, 55 (by their appropriate client interfaces 54A and/or 55A respectively) which may store user profiles and data of comparable nature. Reponses from the HLR, and other such multi-vendor telecommunications network elements which may store user profiles and data of comparable nature are sent back to the computer program product which implements the invention and finally back to the network administrator. Collecting, routing, and formatting 100A of the data is all performed by the logic of the invention.

In alternate embodiments, the computer program product which implements the telecommunications subscriber profile management system may also provide an interface to the Provisioning Database (PDB). The computer program product which implements the telecommunications subscriber profile management system uses the interface to Query and update the network element identifier associated with a MSISDN or alternative subscriber identifier, which is then displayed in the user interface of the invention. The PDB interface articulated with the invention provides capabilities as retrieve subscription (Query), create subscription, update subscription; and delete subscription. The computer program product which implements the telecommunications subscriber profile management system maintains a mapping table that associates the network address (for example, a SS7 point code) to a configurable alphanumeric network element identifier. The invention's PDB interface uses the network address of the network elements (for example, Home Location Registers) in communications with the PDB, however, the invention displays the alphanumeric value of the network elements in the user interface.

Returning with reference to FIG. 1, in the preferred embodiment, every transaction processed by the computer program product which implements the telecommunications subscriber profile management system 100 will be logged and a Transaction ID number will be assigned to it for purposes of convenience. All logs will be captured into the invention's transaction database 100C. Once stored, such data remains accessible by network administrators (and like personnel) for a configurable time period. After which time, in the alternate embodiment, the database entry will be placed into a computer readable file format (or like logical media) for upload and transmission to an off board storage database. During the time the information is accessible by network administrators (and like personnel), the data can be retrieved through multiple level querying on any of the stored parameters. Furthermore, in alternate embodiments, since the Transaction ID may contain the time of the action, parameters of the query can be time based in furtherance of the art.

Continuing with the preferred embodiments, the computer program product which implements the telecommunications subscriber profile management system 100 has been articulated to include a database 100D which stores and remains a repository for the requisite subscriber, terminal, and service information (for example, SIM information). Said database will be propagated in the preferred embodiment through downloads of information as well as updates via interfaces to a network operators provisioning infrastructure and man machine interfaces as the case may be.

In the specific embodiment whereby SIM information is stored in the database 100D, subscriber information includes IMSI, ICCID, KI and the DES encryption key identifier ("transport key") (although practitioners skilled in the art will recognize that the list remains non-limiting and only bound by the state of the art). The DES key, also known as the transport key, will be the same for an entire batch of SIMs. The IMSI is a fifteen (15) digit subscriber identity number. The ICCID is a twenty (20) digit number (usually printed on the relevant SIM card according to modern manufacturing protocols). In alternate embodiments, where less then twenty (20) numbers are entered, the filler 'F' will be placed at the end. The Ki is a thirty-two (32) alphanumeric key.

Information in the database is accessible by specified network administrators (and like personnel) through querying and reporting. The principal administrator sets access privileges to the other personnel user levels. In recognizing the sensitivity and secrecy of much of this information, access in the real-time working embodiment need be closely controlled. Queries can be performed on IMSI, ICCID or DES key. In the preferred embodiment, since database information remains unchangeable once loaded, only read access is allowed to the database 100D. In alternate embodiments, the ability to write certain information to said SIM database 100D may be articulated as per matters of national security and members entitled to enforce the interests of the State and/or Her Majesty's dominion.

Another manifestation of the invention provides a secure repository 100D for information objects associated with a plurality of subscribers. The information objects can be retrieved, stored, or modified via an Application Programming Interface (API) 50A at which will include a number of parameters including but not limited to the a subscriber identifier (for example, a MSISDN) and a transaction identifier. The purpose of the transaction identifier being to uniquely correlate a given request with other messages which may be received asynchronously including, but not limited to, a confirmation response. Practitioners skilled in the art shall recognize that a variety of object oriented application programming interfaces (e.g. Common Object Request Broker Architecture (CORBA) or Extensible Markup Language (XML)) may be used. Practitioners skilled in the art will recognize the information objects which may be retrieved by a given application may be used to modify or optimize a given service or capability to the subscriber's preferences as implicitly or explicitly prescribed via the information objects associated with a given subscriber.

The information objects associated with a given subscriber include, but are not limited to, information pertinent a given subscriber's preferences and/or payment information; information and parametric attributes associated with the services or capabilities subscribed to or potentially subscribed to by a given subscriber; parametric attributes associated with the subscriber's mobile device(s); application level data associated with a given subscriber's service; as well as alternate identifiers or aliases associated with a given subscriber. The art and teachings related to subscriber's SIM information has already been elucidated erstwhile.

To the extent that information exists in an existing multiple multi-vendor element, an optional manifestation of the invention relates to where and how to retrieve said information. Those skilled in the art will recognize that a number of interconnection protocols and interfaces may be utilized to access the plurality of multi-vendor network elements without diluting the intent and scope of the present invention. Not shown are the protocol and interface adaptors and communications links which would provide the physical and logical connectivity for the purpose of establishing connectivity to the plurality of network elements.

The invention may act as a temporary repository or cache whereby information retrieved from a network element may be stored for a configurable period of time in the invention's internal database. Those skilled in the art will also recognize that the nature and functionality associated with the cache including which information is cached and for what duration would be configurable.

Members skilled in the art will recognize that the aforegoing represents an illustrative recital of the preferred embodiments of the invention of present and other embodiments may be articulated, gleaned and articulated from such while still remaining with in its spirit and scope. Indeed, equivalents found within the state of the art, and those which may reasonably and effectively be deemed equivalent in the future should also be understood as being incorporated by reference hereto and such. Furthermore, much of the language has been illustrative and is to be construed as expressly for pedagogical purposes in helping elucidate the art as concisely and beneficially as practical.

What is claimed is:

1. A telecommunications subscriber profile management method for a telecommunications subscriber profile management system, said system including a customer service representative ("CSR") terminal, said terminal configured to present subscriber profile data in a common user interface format, said terminal further configured to receive input in a common format, said input representing commands for management of said subscriber profile data, said system including at least two disparate network elements, each of said network elements having a common function, each of said elements for storing respective portions of said subscriber profile data, each of said elements configured to store said subscriber profile data in disparate formats, said method comprising the steps of:

connecting to said customer service representative terminal;

interfacing with each of said disparate network elements;

collecting, routing, and formatting data exchanges between said terminal and said network elements; and configuring said subscriber profile data in a common format for said terminal while respective portions of said subscriber profile data are configured for storage in disparate formats respective to each said network element.

2. The method of claim 1, wherein said elements comprise home location registers.

3. The method of claim 1, wherein said elements comprise application location registers.

4. The method of claim 1, further comprising a rule database connected to said computer and configured to identify formatting respective to said elements and said interface terminal.

5. The method of claim 1, further comprising a transaction database connected to said computer and configured to maintain a log of transaction records of each collecting, routing, and formatting operation performed.

6. The method of claim 1, wherein said each of said records includes a unique transaction ID.

7. The method of claim 6, wherein said input includes queries to retrieve at least one of said records based on said Transaction ID.

8. The method of claim 1, wherein said system further comprises a secure repository database connected to said computer, and wherein said method further comprises the step of maintaining information objects associated with a plurality of subscribers.

9. The method of claim 8, wherein said information objects include SIM information.

10. The method of claim 9, wherein said SIM information includes at least one ISMI, ICCID, KI, and the DES encryption key identifier.

11. The method of claim 8, wherein said information objects include subscriber preferences, subscriber payment information, parametric attributes associated with subscriber services, parametric attributes associated with a subscriber's mobile device(s), application level data associated with a subscriber's service, and alternate aliases associated with a given subscriber.

12. The method of claim 8, wherein said system further comprises at least one additional interface, and wherein said method further comprises the step of performing at least one of a retrieval, a storage, or a modification of said information objects at said at least one additional interface.

13. The method of claim 1, wherein said elements are provided by different vendors.

* * * * *